United States Patent [19]

Nitzberg et al.

[11] Patent Number: 4,800,913
[45] Date of Patent: Jan. 31, 1989

[54] BREAKAWAY BALL JOINT SWIVEL COUPLING

[75] Inventors: Leonard R. Nitzberg, Knoxville, Tenn.; Paul D. Carmack, Tipp City, Ohio

[73] Assignee: Helix Enterprises, Inc., Knoxville, Tenn.

[21] Appl. No.: 209,065

[22] Filed: Jun. 20, 1988

Related U.S. Application Data

[63] Continuation-in-part of Ser. No. 107,947, Oct. 13, 1987, Pat. No. 4,779,638.

[51] Int. Cl.$^4$ .............................................. F16L 37/28
[52] U.S. Cl. .............................. 137/68.1; 137/614.04; 285/1; 285/2
[58] Field of Search .................. 137/68.1, 614.04; 285/1, 2, 316

[56] References Cited

U.S. PATENT DOCUMENTS

| | | | |
|---|---|---|---|
| 403,916 | 5/1889 | Collins | 285/1 |
| 950,263 | 2/1910 | Harpster | 137/614.04 |
| 2,803,473 | 8/1957 | Hohmann | 137/614.04 |
| 3,383,122 | 5/1968 | Richardson | 285/1 |
| 4,269,226 | 5/1981 | Allread | 285/1 |

Primary Examiner—A. Michael Chambers
Attorney, Agent, or Firm—Alan Ruderman

[57] ABSTRACT

A combination spherical swivel joint and quick disconnect coupling device for a fuel supply line or the like permits universal swiveling of a spherical member within a socket member while the members are connected together in flow communication, and has interconnectable means for uncoupling when an external tensile force above a predetermined limit is applied to the fuel line. Valving is disposed within the spherical member and within the socket member so that when the members uncouple the passageway within each member is closed. A retaining member positioned within the socket member maintains the coupling relationship during normal operation. In one embodiment the retaining member is secured to the socket member by a frangible shear pin, while in another embodiment the retaining member is attached to the socket member by a compressible annular spring positioned with an annular groove having a cam surface which permits the spring to be compressed and released from the groove when the tensile force exceeds the predetermined limit.

15 Claims, 2 Drawing Sheets

BREAKAWAY BALL JOINT SWIVEL COUPLING

REFERENCE TO RELATED APPLICATIONS

This application is a continuation-in-part of copending U.S. application serial No. 07/107,947, filed Oct. 13, 1987.

BACKGROUND OF THE INVENTION

This invention relates to a fluid line swivel joint connector having a quick disconnectable coupling for uncoupling and shutting flow of the fluid through the line, and more particularly to a ball joint or spherical swivel connector having detachable means which quickly decouples to shut flow communication at the joint when the tensile load at the joint is above a predetermined level. The connector has specific application for use in a fuel supply line of a fuel dispensing station for permitting a dispensing nozzle to pivot relative to the fuel line or permitting a first section of the line to pivot relative to another section.

It is known in the fuel dispensing art to include a swivel connector at the dispenser/hose interface so that twisting loads applied to the dispenser are not transmitted to the hose resulting in twisting thereof Such swivels merely permit the dispenser, such as a fuel dispensing nozzle, to be pivoted about one or more axes relative to the axis of the hose, the swivel permitting flow communication between the hose and the dispensing device.

Additionally, it is known to utilize quick disconnect or breakaway couplings in the fuel line spaced from the dispenser so that if a vehicle is driven away from the fuel dispensing station before the dispensing nozzle is removed from the filler neck of the vehicle, an uncoupling will result, shutting the flow of fuel and preventing the volatile fuel to be spilled due to either a dislodging of the moorings of the fuel dispensing station, breakage of the hose, or other failure of the fuel dispensing system. The prior art has proposed a number of decouplers which are actuated by a tensile force on the line. A frangible or shear pin has been proposed and utilized in a number of devices, one such device being illustrated in U.S. Pat. No. No. 3,719,194, and another being illustrated in U.S. Pat. No. 4,646,993. Additionally, at least one other device utilizes an infrangible decoupler, such as a groove with spring-loaded detent balls retained together by a collar and uncoupled when a tensile force of predetermined amount is applied to the collar, this device being illustrated in U.S. Pat. No. No. 4,617,975.

In these and the other known quick disconnects the decoupling units are axially or straight flow through devices which are placed in the fuel line generally a short distance from the fuel dispenser. These devices have not been utilized in or attached to the dispensing nozzle since this would subject them to lateral forces resulting in premature uncoupling of the device, thereby creating a substantial nuisance situation.

In our aforesaid copending U.S. application No. 07/107,947, the problems and deficiencies of the prior art decoupler units are described and combination swivel joint and quick disconnect coupling devices are disclosed and claimed, the devices have coupling means between first and second body members which swivel relatively to one another and the coupling means acting normally to connect the body members in flow communication and for decoupling when an external tensile force above a predetermined level is applied to the fuel line, and valving acting for shutting flow communication when the body members are decoupled.

Other swivel joint connectors in the prior art are known to have a ball or spherical joint for providing universal movement of one body member relative to a second body member. Such connectors suffer from the same deficiencies of the other known prior art swivel joint connectors in that they have no quick disconnect or breakaway feature to uncouple when the tensile load exceeds a predetermined amount. Thus, if such protection is provided provision must be made by using a separate coupling device having the quick disconnecting features.

SUMMARY OF THE INVENTION

Consequently, it is a primary object of the present invention to provide a fluid line spherical or ball joint swivel connector having a quick disconnectable coupling for shutting fluid flow through the line when the tensile force on the line is above a predetermined level.

It is another object of the present invention to provide a spherical or ball joint swivel connector for mounting in a fuel supply line of a fuel dispensing station, the connector having detachable means for uncoupling when the tensile load at the joint is above a predetermined level.

It is a further object of the present invention to provide a combination spherical or ball joint swivel and quick disconnect coupling device for the fuel line of the fuel dispensing station wherein the device may be mounted anywhere in the line and uncouple when the tensile force on the line is above a predetermined level.

Accordingly, the present invention provides in a fluid line, such as a fuel supply line, a combination spherical or ball swivel joint and quick disconnect or breakaway coupling device, the device having coupling means between first and second body members which swivel universally or rotatably pivot about infinite axes of rotation relatively to one another, the coupling means acting to connect the first and second body members together in flow communication with each other so that fluid may normally flow through the body members, the coupling means having interconnectable means for decoupling the body members when an external tensile force applied to the fluid line is above a predetermined level, and valve means for shutting flow communication between the body members when they are decoupled.

The coupling means may include recouplable infrangible or replaceable frangible detent means which in either case normally secures interlockable portions of the body members together and permits them to separate when the predetermined external load exerted on the line is exceeded. The infrangible detent means may comprise biased detent elements forced out of normally seated dispositions by the action of the exceeded tensile load, while the frangible means may merely be a breakable member for permitting separation of the body members.

The body members rotatably mate with the detent means acting to releasably secure them together, the mating being through an interconnecting joint such as a spherical surface on a male member and a similarly shaped surface defined in a female member. The male member has an opening for passage of fluid to or from a passageway in the female member. Valving is provided which opens flow communication between the body members when the body members are coupled and which closes communication therebetween when the body members disconnect. The valving includes a first valve means within the spherical male which is biased toward the closed position, but which is urged open by engagement with a second valve means within the female member The first valve means preferably has an annular portion disposed about the fluid passage opening in the male member, the annular portion having peripheral ports for permitting fluid to flow to or from the interior of the annulus into or out of the male body member. The first valve means additionally includes a valve head which closes the opening in the male member when the body members disconnect, the annular portion thereafter extending through the opening. The second valve means preferably includes a spider or the like against which the annular member normally seats, the spider being biased toward the male member and having a valve head which closes the passageway in the female member when the body members disconnect.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIEMNTS

Figure 1:
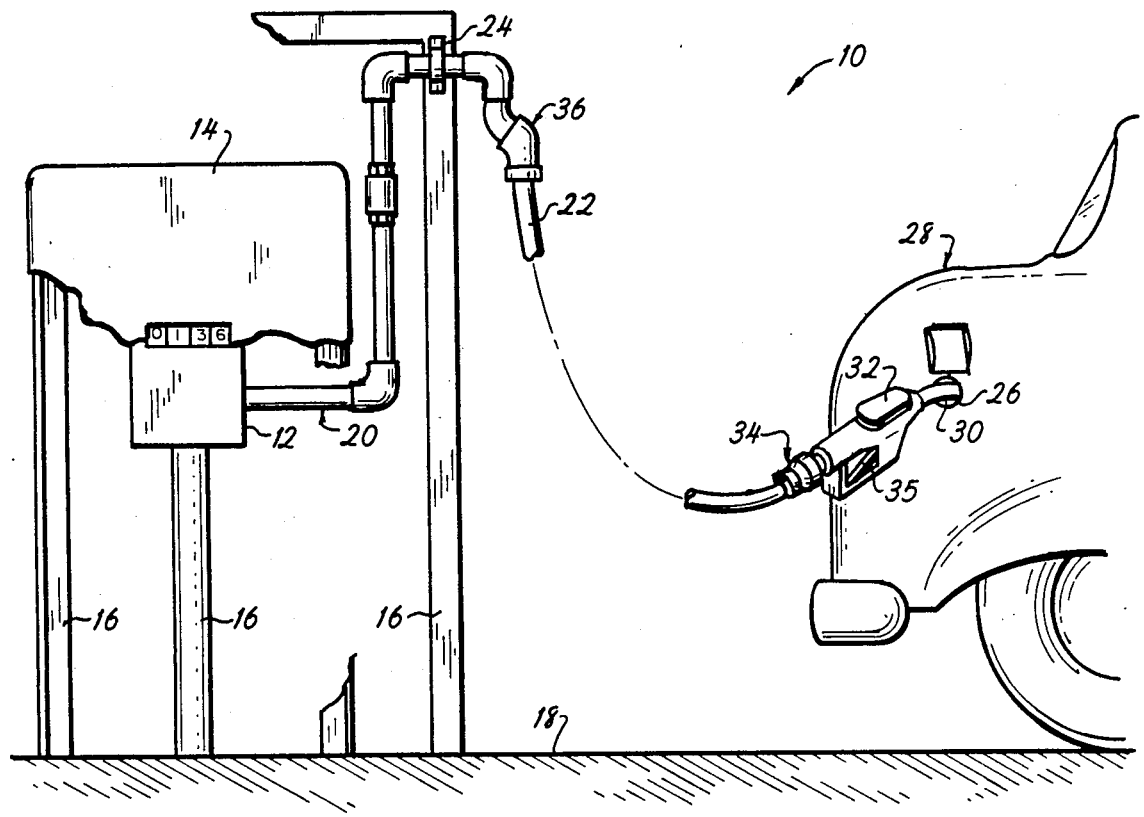
FIG. 1 is an elevational view of a portion of an automobile at a fuel dispensing station illustrating fuel being dispensed into the automobile from pumping apparatus having a fuel delivery line incorporating a swivel joint connector constructed in accordance with the principles of the present invention.

Referring now to the drawings, a swivel joint coupling according to the present invention may be utilized in connection with fuel dispensing facilities of various types especially those dispensing stations which dispense gasoline and diesel fuel to the public. Although other applications may readily be envisioned, for disclosure purposes the present invention will be described in conjunction with fuel dispensing stations located at service stations. Thus, as illustrated in FIG. 1, a dispensing station generally indicated at 10 includes measuring apparatus 12 adapted to receive and measure pressurized fluid fuel, such as gasoline and fuel oil, pumped from a remotely located storage tank through underground piping (not illustrated), the pumping equipment being adapted to be manually actuated by an operator using the facility. The measuring equipment is generally mounted within a cabinet 14 or the like secured to structural framework such as members 16 anchored by conventional means to an island on which the dispensing station is supported or to the ground 18.

Metered fuel exits the measuring equipment after being pumped thereto and from there conventionally flows through piping generally indicated at 20 comprising various conventional piping couplings, nipples, fittings and other conventional connecting members which convey the fuel from the measuring equipment to a flexible hose 22. Adjacent the connection with the hose, and intermediate that location and the measuring equipment, the piping 20 is anchored by conventional anchoring means 24 to a structural support, which may be part of the structural framework 16. The anchoring means 24 secures the piping and resists the external loads which may be placed on the various components to thereby resist damage to those components and the measuring apparatus 12. The flexible hose 22 is of a conventional re-enforced construction as approved by the appropriate regulatory bodies, and may be of any convenient size and length to permit an operator to easily reach the fuel tank inlet 26 of a vehicle 28 for insertion therein of the spout 30 at the end of a rigid dispensing nozzle 32, the nozzle being connected in flow communication with the hose 22 either directly or by means of a swivel joint connector or coupling 34 such as constructed in accordance with the principles of the present invention. Alternatively, the swivel joint connector 34 may be placed between the hose and the rigid piping, such as at 36. However, for purposes of describing the invention, the coupling 34 is disclosed as between the nozzle 32 and the hose 22, the hose being a flexible conduit. Conventionally, the nozzle includes valving in the fluid passageway in the body thereof, the valving being controlled by an adjustment trigger 35 biased to close the valving and operable to open the flow passageway upon depression or squeezing by the operator.

Under normal conditions, a vehicle operator will drive his or her vehicle 28 adjacent the fuel dispensing station 10, and then either an attendant or the operator will remove the nozzle 32 from a storage location on the cabinet 14, turn on the pumping equipment, insert the nozzle spout 30 into the inlet to the vehicle fuel tank, and squeeze the trigger 35 to dispense the fuel. When the dispensing operation is completed, the individual is expected to remove the nozzle spout from the fuel tank inlet, turn off the pumping equipment and replace the nozzle on the cabinet. After paying for the fuel received, the vehicle operator will drive the vehicle from the premises. Occasionally, a vehicle may be driven from the proximity of the dispensing station 10 without first removing the nozzle spout 30 from the fuel tank inlet 26. This may occur for a number of reason, and is not necessarily limited to individual operators pumping their own gas, but could occur as a result of a driver of a large truck not being able to see the station attendant and believing the fueling process to be completed. When this occurs forces are generated at the nozzle which may dislodge and damage the measuring equipment 12, the forces generated at the nozzle being tensile forces which are transmitted through the hose 22 to the piping and resisted by the anchoring means 24. However, when such forces exceed that for which the anchoring means is capable of withstanding, damage to the measuring equipment 12 as well as the various components of the piping may result. Additionally, when such damage occurs the highly combustible fuel may be spilled resulting in a potential fire hazard and additional environmental hazards.

Figure 2:
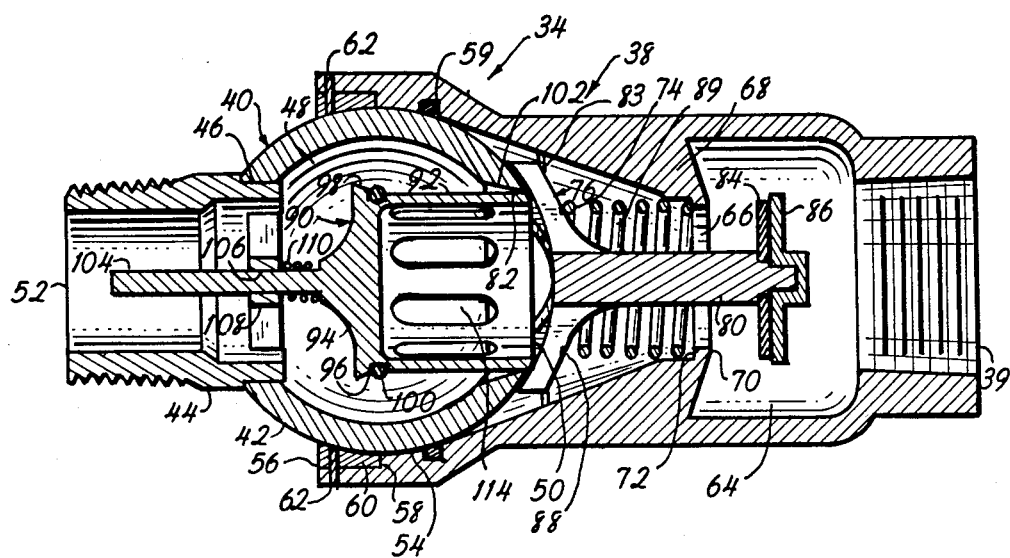
FIG. 2 is a cross sectional view taken longitudinally through a first embodiment of a swivel joint connector constructed in accordance with the principles of the present invention, the connector having frangible uncoupling means.

Referring to the drawings, a first embodiment of the coupling 34 is illustrated in FIG. 2, the coupling comprising first and second body members 38, 40. One of the body members, e.g., member 38 has a female end 39 for connecting to the hose 22, and the other member, e.g., 40, has a male end for connecting to the nozzle 32. Of course, a reversal of the connecting ends may be made without departing from the present invention. The member 40 has a substantially spherical portion 42 receivable within the member 38, and has its connecting end 44 attached to the spherical portion at 46 by any convenient fastening means such as a weld, a threaded connection, or the like. The interior 48 of the member 40 is hollow and has a port 50 in the spherical portion 42 and a port 52 in the connecting end 44, both ports 50, 52 opening into an interior cavity 48 so that fluid entering in one end, e.g., port 50 may flow through the interior cavity and out the other end, e.g., port 52.

The body member 38 has an interior hollow opening into the port 38 at one end for communicating fluid with the hose, and an internal spherical configuration adjacent its other end at a portion 54 acting as a socket and adapted for journaly receiving a corresponding portion of the member 40 for swiveling therein, the member 40 being received in the member 38 through an annular end 56 which is stepped radially and outwardly from the portion 54 to form a counterbored shoulder 58. An elastomeric seal, such as an "O" ring or the like 59 provides a fluid seal between the bodies 38 and 40. Recessed about the spherical member 42 and positioned in the end 56 is an annular retaining member 60, the retaining member having a small end which abuts the shoulder 58 and a larger end substantially co-planar with the annular end 56 of the member 38. The retaining member 60 has an internal configuration corresponding to the spherical configuration of the member 40 to form a continuation of the portion 54 and preferably is formed from a bearing material such as zinc or the like so that the member 40 may journaly swivel therein. The radially outer surface of the retainer 60 is received within and abuts the annular wall of the member 38 in the stepped portion between the shoulder 58 and the end 56.

One or more radially extending bores are formed through the annular wall of the member 38 adjacent the end 56 and are aligned with similar bores formed in the retainer 60 for receiving respective shear pins 62 which normally lock the retainer in place within the annulus of the member 38 and about the spherical surface of the member 42 to retain or couple the members 38 and 40 together. Thus, there is provided a frangible connection for coupling the spherical member or ball 40 and the cooperating socket member 38, the coupling permitting substantially universal swiveling of the ball within the socket. If the tensile force applied between the hose and the nozzle 32 exceeds the shear strength of the frangible means defined by the one or more pins 62, the pin or pins will shear and the members 38 and 40 will uncouple to prevent damage to the fuel supply system as aforesaid.

Figure 3:
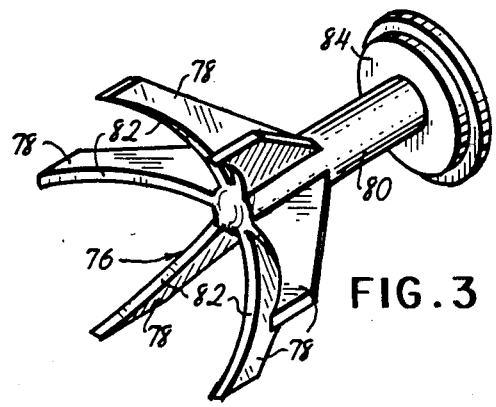
FIG. 3 is a perspective view of a portion of a preferred form of the valving incorporated in the connector illustrated in FIG. 2.

To permit fuel to flow through the coupling 34 when the members 38 and 40 are coupled and yet shut such flow when the members uncouple, the present invention provides valving within each of the members 38 and 40. Thus, the interior member 38 includes an enlarged hollow cavity 64 communicating with the port 39 and which narrows down to a smaller passageway 66 formed by a wall 68 in the body member 38, the periphery of the wall about the passageway 66 within the cavity 64 forming a circular valve seat 70. The wall 68 at the other end of the passageway from the cavity 64 has a shoulder 72 formed at a radially inner step in the wall, the remainder of the wall diverging toward the spherical annular portion 54 to thereby form another cavity 74 within the body member 38. Disposed within the cavity 74 is a spider 76 which, as best illustrated in FIG. 3, comprises a series of spaced limbs or vanes 78 extending from the end of a stem 80 which axially disposed within the body member 38 through the passageway 66.

The surfaces 82 of the vanes 78 remote from the passageway 66, at least at the ends and adjacent portions thereof, have concave configurations so as to receive and contact the exterior surface of the spherical member 42 about the periphery of the port 50 without hindering the swiveling action of the member 40 relative to the member 38. Stop members 83 extending radially inwardly from the wall 68 act against the back radial surfaces of the vanes remote from the surfaces 82 to position the spider vanes 78 radially and for normally contacting the surfaces 82 with the member 42. At the end opposite from the spider 76, the stem 80 has a stepped portion for mounting an annular elastomeric gasket, washer or the like 84 having a diameter larger than that of the passageway 66 so as to form a valve face for cooperating with the seat 70 to close communication of the passageway 66 with the cavity 64 when the body members are separated. A nut or the like 86 is threadedly received on the end of the stem 80 to rigidly back up the member 84 and to secure it to the stem. Disposed about the stem 80 within the cavity 74 is a coil spring 89 having one end abutting the shoulder 72 and its opposite end received within a groove or recess 88 in the rear of the vanes 78 of the spider 76 remote from the surfaces 82 so as to normally bias the spider toward the end 56 of the body member 38 and thus bias the valve face 84 into abutting relationship with the valve seat 70 and close the passageway 66.

Disposed within the hollow interior 48 of the spherical portion 42 of the body member 40 is a check valve 90 having a hollow cylindrical skirt 92 disposed about the port 50 and extending into the hollow 48 toward the port 52 and terminating in a closed head 94. The diameter of the skirt 92 is slightly less than the diameter of the port 50 so as to extend therethrough as hereinafter described. An annular groove 96 is formed at the interface of the cylindrical portion 92 and the head 90, the groove 96 being recessed relative to a peripheral lip or flange 98 forming the border of the head 94. An annular seal in the form of a "O" ring or the like 100 is disposed within the groove 96 and acts as a valve face. The lip 98 has a slightly larger diameter than that of the cylindrical skirt 92 and of the port 50 so that although the skirt may extend through the port 50 when the body members 38 and 40 separate, the lip 98 is precluded from doing so. The lip 98 is slightly chamfered and mates with an inclined annular wall 102 of the spherical body 42, the wall tapering from the interior surface of the body 42 to the exterior surface at the plane of the port 50. The lip 98 together with the surface 102 form a valve seat for the check valve 90 and the valve face seal 100 seals the port 50.

The end of the valve head 94 remote from the cylindrical skirt 92 includes an elongated stem 104 which is slidably journalled within a central bore 106 in a radial wall 108 formed in the member 40. A coil spring 110 disposed about the stem 104 acts between the wall 108 and the head 94 to bias the valve 90 in the direction of the port 50 so that when the members 38 and 40 separate the valve 90 will close the port 50 and the lip 98 seats against the surface 102.

When the body members 38 and 40 are connected the leading edge of the annular wall 112 of the cylindrical skirt 92 and the vanes 78 of the spider 76 abut and forcibly compress both springs 89 and 110 to open the passageway 66 and the port 50. The skirt has a plurality of slotted openings 114 disposed about the periphery so that fluid flowing, for example, from the inlet port 39 of the body member 38 flows through the port 50 into the interior of the cylindrical skirt 92 and out the openings 114 into the interior cavity 48 of the body member 40 and out the outlet port 52. Of course, if the port 52 is the inlet, then the fluid flows through the openings 114 and through the annulus of the skirt and the port 50 and out the port 39.

The spherical body may rotate universally relative to the body 38 without shutting communication therebetween. However, if the external tensile load applied to the conduit and thus between the body members 38, 40 exceeds the shear strength of the pins 62 thereby resulting in failure thereof, the bodies will uncouple. When this occurs, the skirt 92 no longer abuts the vanes 78 and the springs 89 and 110 urge the valves to close their respective flow paths 66, 50 by forcing the valve face 84 to engage the seat 70 and seal the passageway 66, and forcing the lip 98 to enter and seat with the annulus defined by the surface 102 and the "O" ring 100 to seal the port 50. Thus, in which ever direction fluid flows through the coupling, flow shuts as communication between the body members 38 and 40 terminate, and leakage is prevented by the valving. To reconnect the body members together after such an uncoupling, the spherical member is forced into the socket to overcome the bias of the springs 89 and 110, the retaining member 60 is repositioned and new pins 62 are inserted into the aligned bores in the retainer 60 and the annular wall of the body member 38. The coupling thereafter permits fluid to flow through the conduit.

Figure 4:
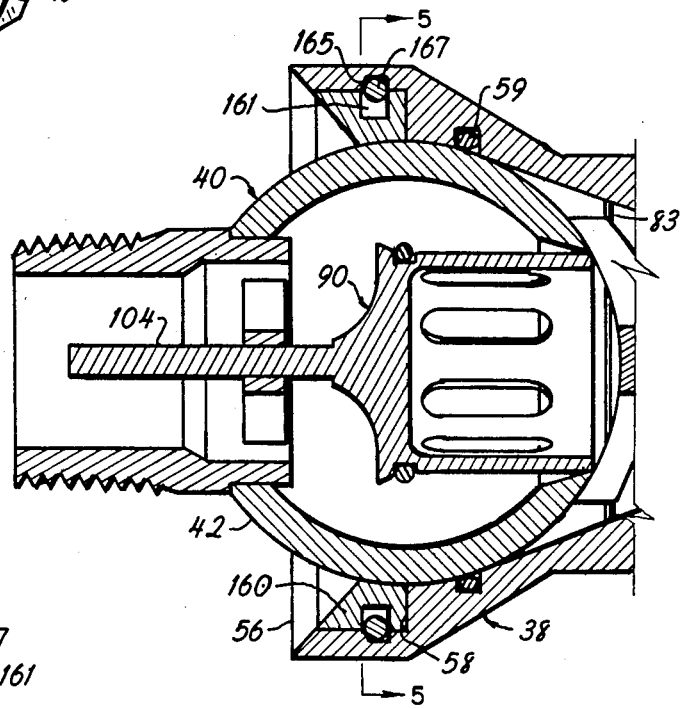
FIG. 4 is a fragmentary cross sectional view of a portion taken longitudinally through a second embodiment of a swivel joint connector having an infrangible uncoupling means constructed in accordance with the present invention.
Figure 5:
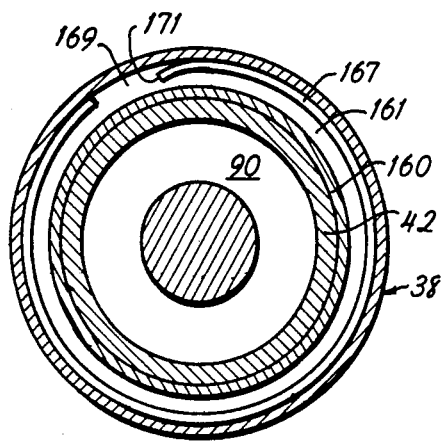
FIG. 5 is a cross sectional view taken substantially along line 5—5 of FIG. 4.
Figure 6:
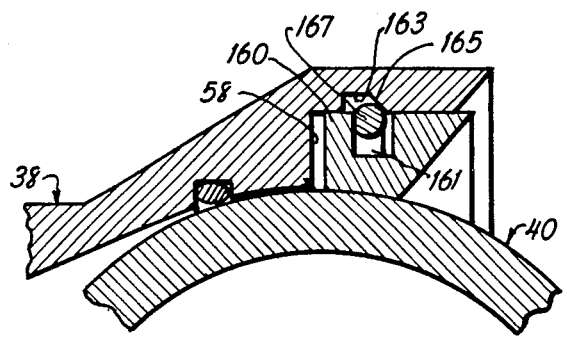
FIG. 6 is an enlarged cross sectional view of a portion of the connector of FIG. 4 illustrating the uncoupling of the elements.

A second embodiment of the invention, one having an infrangible detent means for uncoupling without failing when an excessive tensile load is applied across the coupling, is illustrated in FIGS. 4 and 5. Except for the detent means for releasably locking the body members together, the coupling has the same structure as that of the first embodiment and thus only the differences are hereinafter described. Here, as illustrated in FIGS. 4 and 5, a retaining member 160 which is positioned within the end 56 of the body member 38 in the manner similar to the retaining member 60, has a peripheral groove 161 which opens into an annular groove 163 in the inner peripheral wall of the annular wall adjacent the end of the body member 38. One end of the groove 163, i.e., the end facing the end 56, has an inclined surface 165 which slopes toward the end 56 radially inwardly and forms a cam surface. A pre-loaded annular detent spring 167 is positioned within the groove 161 and compressed so that the retaining member with the spring held within that groove may be positioned against the shoulder 58. The spring may then expand until a portion thereof is disposed within the groove 163. The spring 167, which may be constructed from steel spring wire, has a gap 169 in its circumference which permits the spring to be compressed so that it may be loaded into the groove 161. Once so positioned, the spring may expand within the grooves and forcibly acts to secure the retaining member 160 and thus the body member 40 to the body member 38 against the shoulder 58. Additionally, one end of the spring 167 may be turned in as illustrated at 171 to prevent the unloaded spring from escaping from the groove.

If the tensile force applied to the coupling exceeds the predetermined load, the spring 167 is pulled against the cam surface 165 and, as illustrated in FIG. 5, will be compressed into the groove 161 until it is completely out of the groove 163. As it does, the retaining member will move with the spring until it is unlocked from the body member 38 to thereby permit the body members 38 and 40 to uncouple. Of course, the valving described in regard to the first embodiment then acts to shut flow communication between the body members 38, 40. To recouple the body members 38 and 40, the spring 167 need only be positioned within the groove 161, recompressed, and the retaining member reinserted into the annular open end 56 until the spring reaches the location of the groove 163 and expands to relock the retaining member 161 together with the body member 40 to the body member 38.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. In a fuel dispensing system including a liquid fuel dispensing station for receiving fuel from a remote location and supplying fuel to a supply conduit, a flexible fuel line operatively connected in flow communication to said conduit, and a nozzle including operator actuating means operatively connected to said fuel line, a detachable safety device connected in said fuel line intermediate said nozzle and said conduit for coupling portions of said line together and for uncoupling when a predetermined excessive tensile force is applied externally to said fuel line, said device comprising first and second body members, one of said body members having a spherical portion, the other of said body members having a socket portion including an open end annular mouth having an inner periphery for receiving said spherical portion, each of said body members having a fluid passageway extending therethrough, each of said passageways having portals defining an inlet and an outlet, coupling means interconnecting said spherical portion to said socket portion for swiveling movement about a multiplicity of axes relatively to one another with the outlet of a first of said body members connected in flow communication with the inlet of the second of said body members to permit fuel to flow therethrough when said body members are coupled, said coupling means including a releasable annular retaining member disposed about part of said spherical portion, said retaining member having an inner periphery conforming to said spherical portion for journally receiving said part for swiveling therein and an outer periphery conforming to the inner periphery of said mouth for retaining said spherical portion within said mouth, locking means for locking said retaining member within said mouth to thereby couple said body members together and for unlocking and releasing said retaining member from said mouth to uncouple said members when an external tensile force above said predetermined limit is applied to said fuel line, and valve means in the fluid passageway of each body member for shutting flow communication between said body members when uncoupled.

2. In a fuel dispensing system as recited in claim 1, wherein said locking means comprises at least one shear pin extending radially through said mouth and into said retaining member, said pin having a longitudinal axis substantially normal to the direction of said tensile force.

3. In a fuel dispensing system as recited in claim 1, wherein said locking means comprises an annular groove disposed in said outer perhiphery of said retaining member, said groove opening into an annular groove in said inner periphery of said mouth, a cam surface inclined from a wall of said groove toward said spherical portion and said open end, an annular detent spring disposed within the groove of said inner periphery of said mouth and within an adjacent portion of the groove of said retaining member, and said spring having a peripheral gap to permit the periphery thereof to be reduced when compressed so that when an external tensile force above said limit is applied said spring is forced against and rides on said cam surface and compresses to escape from the groove in said mouth to release said retaining member.

4. In a fuel dispensing system as recited in claim 1, wherein said valve means comprises a spider member disposed in said socket portion having a plurality of spaced vanes, said vanes having spherical surfaces facing toward said open end, a stem attached to said spider remote from said surfaces, a valve head fastened to said stem, means defining a valve seat in the passageway of said socket, biasing means for urging said spider toward said mouth and said valve head toward said seat and for abutting said spherical surfaces against said spherical portion when said body members are coupled to hold said valve head out of closing engagement with said valve seat and for forcing said valve head into sealing relationship with said valve seat when said body members are uncoupled.

5. In a fuel dispensing system as recited in claim 4, wherein said valve means further comprises a valve member in said spherical portion, a valve seat formed within said spherical portion about a border of a first portal thereof, said valve member having a hollow annular skirt adapted to be disposed within said first portal for abutting said vanes when said body members are coupled, said skirt having flow channels communicating the interior of said skirt with the passageway in said spherical portion, and biasing means for urging the valve member toward said first portal for forcing said skirt through said first portal and for sealingly engaging said valve seat in said spherical portion when said body members are uncoupled.

6. Apparatus as recited in claim 5, wherein said locking means comprises at least one shear pin extending radially through said mouth and into said retaining member, said pin having a longitudinal axis substantially normal to the direction of said tensile force.

7. Apparatus as recited in claim 5, wherein said locking means comprises an annular groove disposed in said outer perhiphery of said retaining member, said groove opening into an annular groove in said inner periphery of said mouth, a cam surface inclined from a wall of said groove toward said spherical portion and said open end, an annular detent spring disposed within the groove of said inner periphery of said mouth and within an adjacent portion of the groove of said retaining member, and said spring having a peripheral gap to permit the periphery thereof o be reduced when compressed so that when an external tensile force above said limit is applied said spring is forced against and rides on said cam surface and compresses to escape from the groove in said mouth to release said retaining member.

8. In a fuel dispensing system including a liquid fuel dispensing station for receiving fuel from a remote location and supplying fuel to a supply conduit, a flexible fuel line operatively connected in flow communication to said conduit, and a nozzle including operator actuating means operatively connected to said fuel line, a detachable safety device connected in said fuel line intermediate said nozzle and said conduit for coupling portions of said line together and uncoupling when a predetermined excessive tensile force is applied externally to said fuel line, said device comprising first and second body members, one of said body members including a hollow spherical portion having a portal for ingress and egress of fuel into and out of said spherical portion, a valve seat formed in said spherical portion adjacent said portal, a valve in said spherical portion for engaging said seat to close said portal, biasing means for urging said valve into closing engagement with said seat, the other of said body members comprising a socket including a mouth having an open end for receiving said spherical portion, abutment means within said mouth of said socket, a passageway within said socket opening onto said mouth, a valve within said socket member for closing said passageway, means for biasing said abutment means toward said open end and for urging said valve to close said passageway, coupling means interconnecting said spherical portion in said mouth for swiveling movement about a multiplicity of axes with said portal communicating with said passageway and with said abutment means engaging the valve in said spherical portion to force said valve in said spherical portion and the valve in said socket out of closing relationship with said portal and said passageway respectively, said coupling means including a releasable annular retaining member disposed within said mouth, said retaining member having means for journally receiving said spherical portion and for maintaining the spherical portion within said mouth, and locking means for locking said retaining member within said mouth to thereby couple said spherical portion within said mouth and for unlocking and releasing said retaining member from said mouth to uncouple said members when an external tensile force above said predetermined limit is applied to said fuel line.

9. In a fuel dispensing system as recited in claim 8, wherein said locking means comprises at least one shear pin extending radially through said mouth and into said retaining member, said pin having a longitudinal axis substantially normal to the direction of said tensile force.

10. In a fuel dispensing system as recited in claim 8, wherein said locking means comprises an annular groove disposed in an outer perhiphery of said retaining member, said groove opening into an annular groove in an inner periphery of said mouth, a cam surface inclined from a wall of said groove in said mouth toward said spherical portion and said open end, an annular detent spring disposed within the groove of said inner periphery of said mouth and within an adjacent portion of the groove of said retaining member, and said spring having a peripheral gap to permit the periphery thereof to be reduced when compressed so that when an external tensile force above said limit is applied said spring is forced against and rides on said cam surface and compresses to escape from the groove in said mouth to release said retaining member.

11. In a fuel dispensing system as recited in claim 8, wherein said abutment means comprises a spider member having a plurality of vanes, said vanes having spherical surfaces facing toward said open end and abutting said spherical portion when said body members are coupled.

12. In a fuel dispensing system as recited in claim 11, wherein said valve in said spherical portion includes a hollow cylindrical annular skirt adapted to project through said portal when said body members uncouple.

13. In a fuel dispensing system as recited in claim 11, wherein said spider member and the valve in said socket are fastened to a common member and move together.

14. In a fuel dispensing system as recited in claim 13, wherein said valve in said spherical portion includes a hollow cylindrical annular skirt adapted to project through said portal when said body members uncouple.

15. In a fuel dispensing system as recited in claim 14, wherein said skirt includes an enlarged head remote from said portal, said head being larger than said portal for closing said portal when said body members uncouple.

* * * * *